United States Patent [19]

Westermeyer

[11] Patent Number: 4,617,540

[45] Date of Patent: Oct. 14, 1986

[54] AUTOMATIC SWITCH, RAIL-MOUNTED

[75] Inventor: Joseph Westermeyer, Nuremberg, Fed. Rep. of Germany

[73] Assignee: Sursum Elektrizitatsgesellschaft Leyhausen GmbH & Co., Nuremberg, Fed. Rep. of Germany

[21] Appl. No.: 664,010

[22] Filed: Oct. 23, 1984

[30] Foreign Application Priority Data

Oct. 29, 1983 [DE] Fed. Rep. of Germany ....... 3339401

[51] Int. Cl.[4] .................... H01H 75/12; H01H 73/48
[52] U.S. Cl. ......................................... 335/35; 335/23
[58] Field of Search ............................ 335/37, 35, 23; 361/353

[56] References Cited

U.S. PATENT DOCUMENTS 3,246,098 4/1966 Hall ....................................... 335/35

FOREIGN PATENT DOCUMENTS 2063566 11/1979 United Kingdom .

Primary Examiner—Harold Broome
Attorney, Agent, or Firm—Holman & Stern

[57] ABSTRACT

An automatic switch comprised of a dual-contact switch mechanism, a bimetallic thermostatic element, a solenoid-style tripping device, and an arc chamber complete with deionization plates. To eliminate one of the three electrical-hook-up steps (one, the physical attachment to a mounting, and the two electrical terminal connections), a group of components is provided for the switch assembly, including a plug-like terminal, which forms one end of the switch's electrical terminals on the rear housing wall, and an additional snap-action holding element disposed at the distal part of the rear housing wall from said plug-like terminal. The automatic switch incorporating these components can thus be snap-mounted onto a conductor rail by means of said plug terminal and onto a separate nonconductive mounting bar or rail—all in a single step. The remaining conductor can be wired-up in the traditional way thereby placing this switch in a circuit by only a two-step procedure.

5 Claims, 2 Drawing Figures

4,617,540

AUTOMATIC SWITCH, RAIL-MOUNTED

BACKGROUND OF THE INVENTION

The invention relates to rail-mounted automatic electrical switches which are intended for limited-space applications.

The applicant is commercially marketing a similar automatic switch under the name "Sursum Typ EA." In this known small automatic switch, the mounting device is comprised of two mutually facing hooks disposed at a distance from each other, one of which hooks is spring-loaded. Both hooks extend behind parallel mounting-rail edges, engaging them from their outer surfaces. The second hook is pushed over its corresponding rail edge while the first one is undergoing a spring-loaded retraction. Both electrical terminals in this switch are of the screw-clamp type (binder posts). These two screw clamps are wired to the external circuit leads following the actual mounting of the automatic switch on the rails. Experience has shown that these mounting steps are costly.

It is therefore an object of the invention to devise an automatic switch of the type described supra, and particularly to modify the "Sursum Typ EA" automatic switch, such that one of the three mounting steps is eliminated. This object is achieved by the invented automatic switch in that one of the mounting devices also serves as a terminal which is connected to one of the electrical leads, and in that the other mounting device consists of a separate snap-action holding means disposed at a distance from said mounting terminal. Thus, one electrical connection is achieved with the mounting of the automatic switch on the rails, one of which is a conductor. Therefore, only two mounting steps in all are required, namely, the mounting onto the rails and the wiring of the second screw clamp.

A known mounting device (U.S. Pat. No. 2,842,635) comprised of a plug contact and a separate snap-action holding element could be employed with an automatic switch of the type described supra, in particular the "Sursum Typ EA," so that that class of switch might contain a plug terminal which could be snapped onto a current-carrying rail. In this way, a miniature automatic switch could be made compatible with the advantageous and widely used system wherein switch supports consist of rails, with one of said rails being current-carrying. This combination of the "Sursum Typ EA" with the known mounting device would be nonobvious to one of ordinary skill in the art because it entails a number of major alterations to the structure of the known automatic switch. In place of the rail upon which the additional snap-action holding element is engaged, another engaging piece could be provided, e.g., a dog or spring-loaded detent.

If the bimetallic thermal tripping element, the switch mechanism, and the switch contacts of the "Sursum Typ EA" are moved toward one lateral side, and the hand lever and the impact-armature tripping device are moved toward the other lateral side, it would be particularly advantageous if the plug terminal could be arranged on the first-mentioned lateral side, and the additional snap-action holding element arranged on the other lateral side. This positioning of the plug terminal is advantageous in the context of the overall arrangement of components in the housing, in contrast to the known switch.

If a support strip bearing the bimetallic thermal tripping element were to be anchored to a lateral face of the housing, it would be particularly advantageous if the plug terminal, which should pass through an opening in the the rear of the housing, lockingly could engage a side of the housing and could be electrically connected to the metallic support strip inside the housing. The support strip already present in the known automatic switch could thus be employed, and the plug terminal would require less housing interior space while still being securely held.

SUMMARY OF THE INVENTION

The objects of this invention are achieved through the new design for an automatic switch comprised of a small, narrow housing (box), a hand lever on the front side, and further comprised of in the forward part of the housing a switch mechanism, a bimetallic thermal tripping element, and an impact-armature (solenoid) tripping device. The rear part of the housing contains an arc chamber which houses a pair of switch contacts and deionization plates. Two electrical terminals are also provided, one on each opposite face of the front and rear of the housing, where the uppermost terminal also serves to mount the switch.

An eyelet (with borehole) for insertion of a bolt or screw is also provided at at least three locations on the housing. It is particularly advantageous if the rearmost eyelet and borehole is disposed in the space toward the back side of the housing and beneath the plug terminal. An eyelet for insertion of a bolt or screw is also disposed at the top of the housing near the bimetallic thermal tripping element. This arrangement makes use of the space between the bimetallic element and the eyelet borehole.

The deionization plates, of generally known composition and construction, are disposed toward the rear of the switch box along with an opening for the passage of arc-generated gases, which adjoins an interior wall section which isolates the rear holding element. The additional snap-action holding element which extends into the housing from the rear side is affixed to said housing and is isolated from the switch's interior by the wall section. The mutual positioning of the gas passage and the interior attachment means for the snap-action holding element is optimally adjusted.

Another eyelet for insertion of a bolt or screw is provided near the bottom of the housing, and the channel for passage of gases is therefore located between the snap-action holding element and this eyelet and borehole.

A detent lever is pivotally mounted on a switch lever which switch lever constitutes the movable contact element of the switch mechanism. When the switch contacts are closed, one end of said detent lever serves to hold in place an arresting lever, and the other end is pivotally attached to one end of an intermediate connecting link piece whose opposite end is pivotally connected to the interior arm of the hand lever. When said switch contacts are closed, the external grip member of the hand lever is oriented upward. This way, the position of the hand lever is optimally adjusted to the state of the switch contacts.

The point where the intermediate link piece engages the hand lever is at the rear of the pivotal hand lever. The arresting end of the detent lever is disposed closer to the forward part of the housing than is the pivotally connecting end of said detent lever. Therefore, with only a slight modification of the general structure of the general type of automatic switch (i.e., "Sursum Type EA"), no detrimental effect on the switch's operation results.

The integrated features relating to the mounting of the plug terminal and of the additinal snap-action holding element are essential to the invented switch. Likewise is the disposition of the eyelets and shaft-type fasteners for joining the two housing sections together (e.g., housing body and cover). A further important feature is the traditional upward orientation of the hand lever when the switch contacts are closed.

A preferred embodiment of the invention is illustrated in the drawings.

DETAILED DESCRIPTION OF THE DRAWINGS

Figure 1:
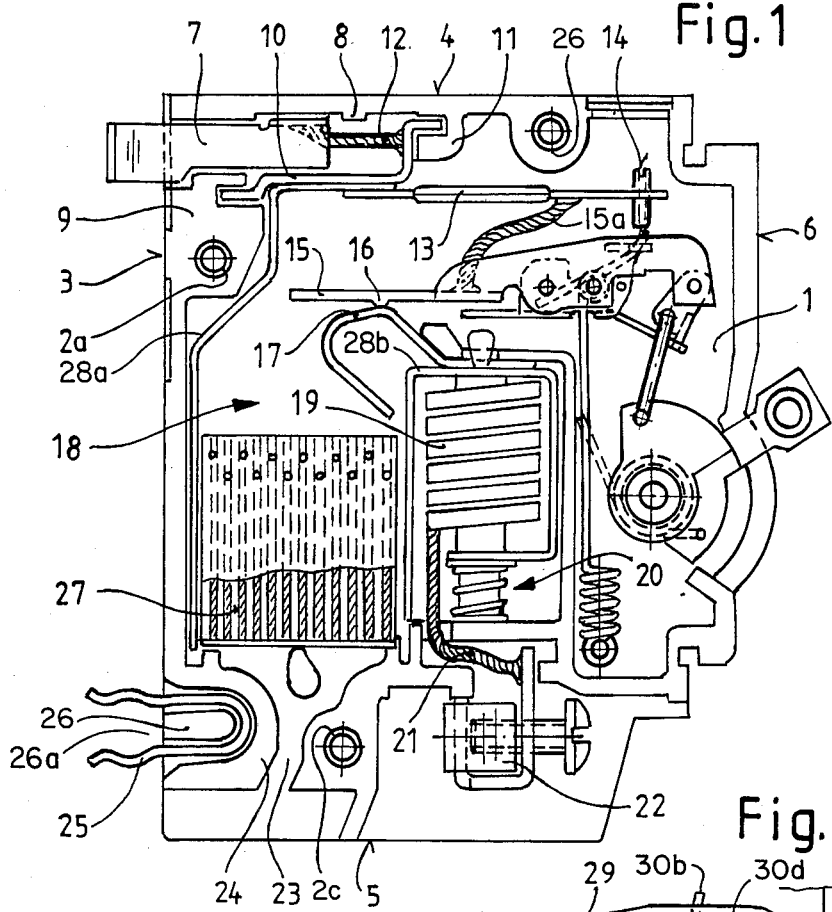
FIG. 1 is a cutaway side view of a closed automatic switch with rail-mounting adaptation and FIG. 2 is an enlarged view of a central detail of FIG. 1.

With reference to FIG. 1, the automatic switch illustrated is of shallow construction and is comprised of several components, including a housing, or narrow box, 1 with sidewalls and a cover (not shown) which may be positioned on top of the housing 1 (the "top" being the plane of the device which exits the page and strikes the observer). The generally rectangular structure of the automatic switch includes an eyelet 2 on each of the sidewalls, which is accompanied by a thickening of the respective sidewall section and which further includes a borehole. Shaft-type fasteners, e.g., rivets, may be pushed through the boreholes together with a set of corresponding holes in the cover to hold the box and cover together. No such eyelet/borehole arrangement is disposed on the forward side 6 of the switch box 1.

A clamp-like, U-shaped plug terminal 7 may be inserted, with play, into a given receptacle (not shown); it is disposed adjacent the upper sidewall of the right lateral side of the box 1. Plug terminal 7 consists of two parallel legs, only one of which is visible in FIG. 1. The purpose of the mechanical play for the inserted plug terminal 7 is to allow for adjustment of the rail-like support member (for the receptacle . . . also not shown). The two projecting legs form a clamping region similar to 26a, but in a perpendicular plane, wherein a conducting rail may be moved longitudinally between said two legs of the terminal 7. The width of the plug terminal 7 decreases inside the housing 1, whereupon it remains essentially straight. A housing rib (not shown) supporting the plug terminal 7 extends into the bottom of the box 1, and another rib 8 supporting the plug terminal 7 extends into the cover to secure against inward and lateral shifting of the terminal 7 when mounting the switch on the rail-like conductor or removing it therefrom. The legs of the plug terminal 7 are vertically arranged in a plane normal to that containing both elements 25 whereby the engaged conductor extends also in the vertical direction along the back side 3 of the switch housing 1.

The plug terminal 7 is installed between an upper section of the lateral sidewal 4 and a thickened region 9 of the near sidewall 3, which also includes an eyelet hole 2a. The thickened region 9 has an interior recess which accommodates the end piece of a metallic support strip 10 which strip 10 has two 90-degree bends as shown in FIG. 1. One bent end section extends into and engages a recess in a prominence 11 on the right upper sidewall of the housing 1. The support strip 10 is adhesively fastened in these two recesses in 9 and 11 whereby it is rigidly secured. The plug terminal 7 is electrically connected to the support strip 10 by a stranded metal wire 12 whereby the hazard of breaking due to the limited mobility (play) of the plug terminal 7 is avoided.

A straight bimetallic tripping element, or thermostat, 13 is also attached to the support strip 10, which element 13 extends past the forward eyelet 2b. An opening in the top of the housing 4 is provided through which a set screw 14 can be adjusted. When said thermal tripping element bends with the conduction of excessive current, the set screw 14 acts on a switch mechanism described infra.

The bimetallic tripping element 13 is electrically connected to a switch lever 15 of the said switch mechanism, via a stranded metal wire 15a. Lever 15 comprises or supports the movable contact element of the switch which cooperates with a fixed contact element 17 at contact point 16, which may also be thought of as the movable contact element itself. The switch mechanism, comprised of the two contact elements 16 and 17, is disposed inside a chamber of the housing referred to hereinafter as the "arc chamber" 18. The fixed contact element 17 is electrically connected to the coil 19 of an impact-armature tripping device 20. The other end of coil 19 is electrically connected to a stranded metal wire 21 which leads to a screw clamp 22, via an opening in the lateral wall, thereby providing for a second switch terminal to function in conjunction with terminal 7. The impact-armature tripping device, or solenoid, 20 is further comprised of a pretensioning spring, a push rod, and a return-conduction plate 28b (more of this later); device 20 is otherwise of a structure which is itself known.

The lowermost eyelet 2c nearest side 5 is located behind the screw clamp 22. A passage 23 for the transfer of gases through the lateral wall adjoins the borehole of said eyelet 2c. Passage 23 is bounded on the rear by a curved wall section 24, behind which a snap-action holding element 25 is disposed which is in the form of a U-shaped two-legged clamp and which is bent around a relief area 26 in the rear of the housing 3 and is thus held in place between the bottom of the box 5 and the cover (not shown). The formed opening 26a between the legs of the holding element 25 is meant to engage a support bar or other device in a horizontal direction along the rear side 3. A set of parallel deionization plates 27 of known composition is disposed inside the arc chamber 18; arc-arresting plates 28 also run parallel to these deionization plates. They run vertically from the base of the support strip 10 and beneath the fixed contact element 17. In the former instance, the plate 28a is electrically coupled between the support strip 10 and the thermal element 13.

Figure 2:
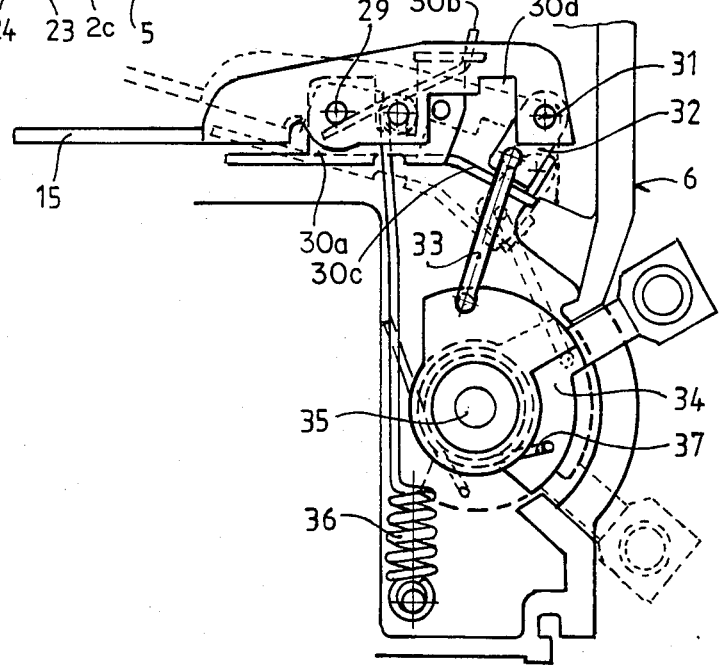

In the switch mechanism of FIG. 2, the switch lever 15 is pivotal about an axis element 29, and supports a three-armed arresting lever 30, also pivotal (independent action) around axis 29. One arm of this lever 30b is directed against the set screw 14 of the bimetallic tripping element 13, the second arm 30a cooperates with the push rod of the impact-armature tripping device 20, and the third arm of this lever 30c projects forward (toward wall 6) in the direction of the free end of the switch lever 15 thereby forming an arresting thrust member to act thereupon. This structure is disclosed in, e.g., German AS 19 04 731 and may also be found in the applicant's copending disclosures Nos. 664,009; 664,011; and 664,012.

Opposite the free end (near wall 6) of switch lever 15, a detent lever 32 is pivotally mounted on a pin 31; one end of this lever 32 cooperates with the thrust member 30c of the arresting lever. An intermediate articulated link piece 33 is pivotally connected to the other end of the detent lever 32, while the other end of link piece 33 is pivotally connected to the internal arm of the hand lever 34 which pivots about pin 35. The external arm of hand lever 34 projects outward through an opening in the front wall of the housing 6. A helical spring 36 acts to draw the switch lever 15 toward an open-circuit position, and a wire spring 37 also acts to move the hand lever 34 toward the "open" position (shown in dotted lines).

In the upward position shown in FIG. 2 for the grip member of hand lever 34, the switch contacts are closed. The angle between the extended middle line of the external grip arm of hand lever 34 and the line extending from pin 35 to the pivot point where the intermediate link piece 33 connects to the internal arm of the hand lever is about 60°. Thus, the kinematics of this structure are arranged such that the detent lever 32 moves away from the forward side 6 of the housing when the switch is opened. The lower end of the detent lever 32 is pressed against the upper edge of the free end of the arresting lever 30c.

When the external grip arm of the hand lever 34 is moved downward, then the pivot point where the link piece 33 connects to the hand lever moves into an opening in the front sidewall 6 of the housing at approximately the location occupied by the external grip arm when it is in its uppermost position. When the detent lever 32 releases the arresting lever arm 30c; i.e., as the detent lever 32 is moved clockwise on pin 31 away from the forward side 6 of the housing, said lever 32 rotates into a space 30d between two offset projections or branches of the switch lever 30, where sufficient room for the detent lever exists in space-saving fashion. In either position shown, a force acting on the intermediate articulated link piece 33 holds the hand lever 34 in its extreme position either up or down.

I claim:

1. An automatic switch for mounting on rails, comprising:
    a hand lever disposed on the front side of a housing and a rail-mounting device on the rear side;
    said rail-mounting device comprising a two-armed plug contact disposed on the upper transverse side and a second holding organ, also two-armed, which is attachable by clip or catch means and is disposed on the lower transverse side at a distance from said plug contact;
    wherewith the lower housing part forms an arc chamber which accomodates deionization plates near the lower transverse side and accommodates a switch contact above said plates, and the forward housing part accomodates an impact-armature trigger near the lower transverse side, and accomodates a switch mechanism and a bimetallic trigger above said impact-armature trigger, wherewith said bimetallic trigger is affixed to a metallic support strip, one end of which extends into a recess in a thickened region of the wall of the rear side;
    wherewith the plug contact is comprised of an electrical connection to the bimetallic trigger, and a screw clamp provided on the lower transverse side forms an electrical connection to the impact-armature trigger;
    wherewith the switch contact is formed by a stationary contact element electrically connected to the impact-armature trigger, along with a movable contact element associated with the switch mechanism and electrically connected to the bimetallic trigger, wherewith the switch mechanism is comprised of a pivotably mounted switch arm which pivotably bears the movable contact element and also pivotably bears a pawl, one end of said pawl detaining a blocking lever when the switch contact is in the closed position and the other end of said pawl being pivotably connected to an intermediate pivoted connecting piece the other end of which intermediate piece is pivotably connected to the inner end of the hand lever;
    wherewith the lever holding organ is disposed at the altitude of the screw clamp and surrounds an elongated appendage of the housing, wherewith an eye including a hole for insertion of a bolt or other shaft-like fastener therebetween is disposed between the lower holding organ and the screw clamp;
    wherewith the opposite end of the support strip of the bimetallic trigger engages in a recess in continuation of the side wall of the upper side and is connected to the plug contact by means of a stranded wire;
    and wherewith, when the switch contact is in the closed position, the grip member of the hand lever is oriented upward, in a direction toward the upper transverse side, the location of engagement of the intermediate pivoted connected piece with the hand lever is disposed on the side of the axle, which side is farther from the front side, and the detaining end of the pawl is closer to said front side than the articulation end of said pawl.

2. An automatic switch according to claim 1, wherein the plug contact form-interlockingly engages a flat side of the housing by means of pins.

3. An automatic switch according to claim 1, wherein an eye with a hole for insertion of a bolt or other shaft-like fastener is disposed between the upper transverse side and the bimetallic trigger, and this transverse side passes directly through from the rear side.

4. An automatic switch according to claim 1, wherein a single gas passage opening is provided in the lower transverse side, said opening is provided in the lower transverse side, said opening being disposed between the cliplike or latchlike holding organ and the eye which eye has the hole.

5. An automatic switch according to claim 1, wherein when the blocking lever is disengaged, the pawl is disposed between two walls of the switch arm and away from the forward side of the sixth of the housing.

* * * * *